US008635390B2

(12) United States Patent
Hnatko et al.

(10) Patent No.: US 8,635,390 B2
(45) Date of Patent: Jan. 21, 2014

(54) SYSTEM AND METHOD FOR A HIERARCHICAL BUFFER SYSTEM FOR A SHARED DATA BUS

(75) Inventors: Steven J Hnatko, Fishkill, NY (US); Gary A Van Huben, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 12/876,512

(22) Filed: Sep. 7, 2010

(65) Prior Publication Data

US 2012/0059958 A1 Mar. 8, 2012

(51) Int. Cl.
*G06F 3/00* (2006.01)
*G06F 5/00* (2006.01)
*G06F 15/16* (2006.01)

(52) U.S. Cl.
USPC ................. 710/53; 710/52; 710/60; 709/233; 711/5

(58) Field of Classification Search
None
See application file for complete search history.

(56) References Cited

U.S. PATENT DOCUMENTS

| | | | | |
|---|---|---|---|---|
| 5,867,509 A * | 2/1999 | Tanaka | ........................... | 714/758 |
| 6,721,796 B1 * | 4/2004 | Wong | ............................ | 709/232 |
| 7,110,423 B1 * | 9/2006 | Sethuram et al. | ............. | 370/519 |
| 7,134,035 B2 * | 11/2006 | Sharma et al. | ................ | 713/500 |
| 7,383,336 B2 | 6/2008 | Strait et al. | | |
| 7,600,034 B2 * | 10/2009 | Nasu et al. | ..................... | 709/232 |
| 7,680,153 B2 * | 3/2010 | Ma | ................ | 370/503 |
| 2001/0009547 A1 * | 7/2001 | Jinzaki et al. | ................. | 370/390 |
| 2002/0083299 A1 * | 6/2002 | Van Huben et al. | ............ | 712/29 |
| 2003/0041224 A1 * | 2/2003 | Toda | ............................. | 711/167 |
| 2004/0024945 A1 * | 2/2004 | Keller et al. | .................. | 710/305 |
| 2004/0034739 A1 * | 2/2004 | Ramagopal et al. | .......... | 711/119 |
| 2004/0057447 A1 * | 3/2004 | Fukunaga et al. | ............ | 370/412 |
| 2004/0202174 A1 * | 10/2004 | Kim et al. | .................. | 370/395.1 |
| 2006/0126770 A1 * | 6/2006 | Yamazaki | ..................... | 375/372 |
| 2006/0179262 A1 * | 8/2006 | Brittain et al. | ................ | 711/169 |
| 2007/0081562 A1 * | 4/2007 | Ma | ................ | 370/516 |
| 2008/0232179 A1 * | 9/2008 | Kwak | ........................... | 365/194 |
| 2010/0005206 A1 | 1/2010 | Hnatko et al. | | |

\* cited by examiner

*Primary Examiner* — Michael Sun
(74) *Attorney, Agent, or Firm* — Stachler Intellectual Property Law LLC

(57) ABSTRACT

The present invention provides a system and method for controlling data entries in a hierarchical buffer system. The system includes an integrated circuit device comprising: a memory core, a shared data bus, and a plurality of 1st tier buffers that receive data from the memory. The system further includes a 2nd tier transfer buffer that delivers the data onto the shared data bus with pre-determined timing. The present invention can also be viewed as providing methods for controlling moving data entries in a hierarchical buffer system. The method includes managing the buffers to allow data to flow from a plurality of 1st tier buffers through a 2nd tier transfer buffer, and delivering the data onto a shared data bus with pre-determined timing.

20 Claims, 7 Drawing Sheets

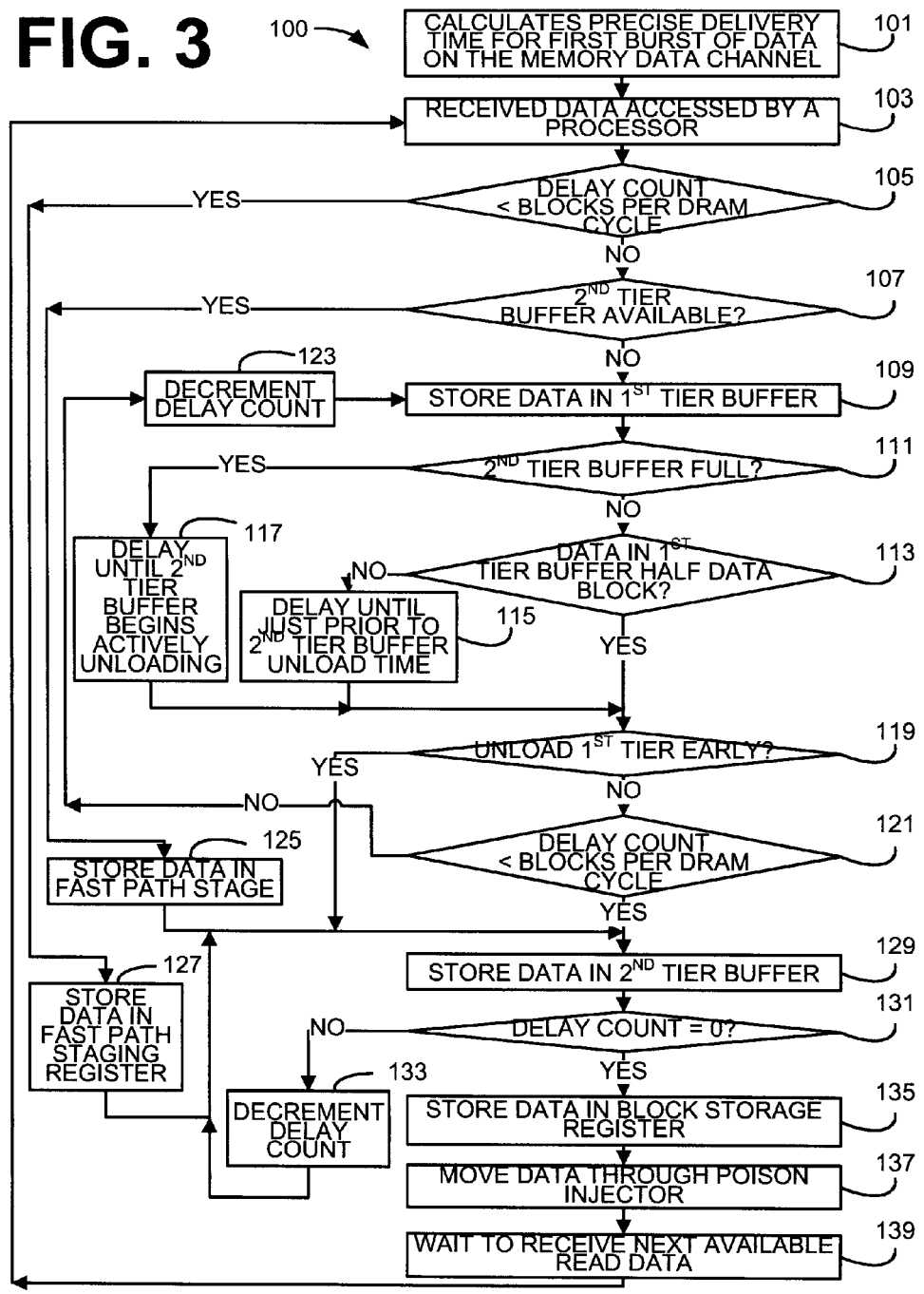

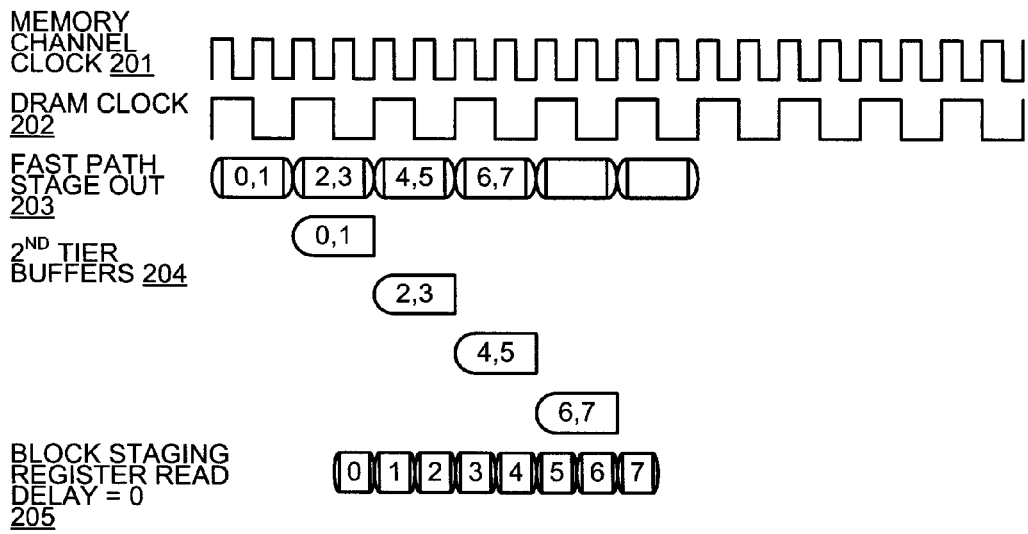
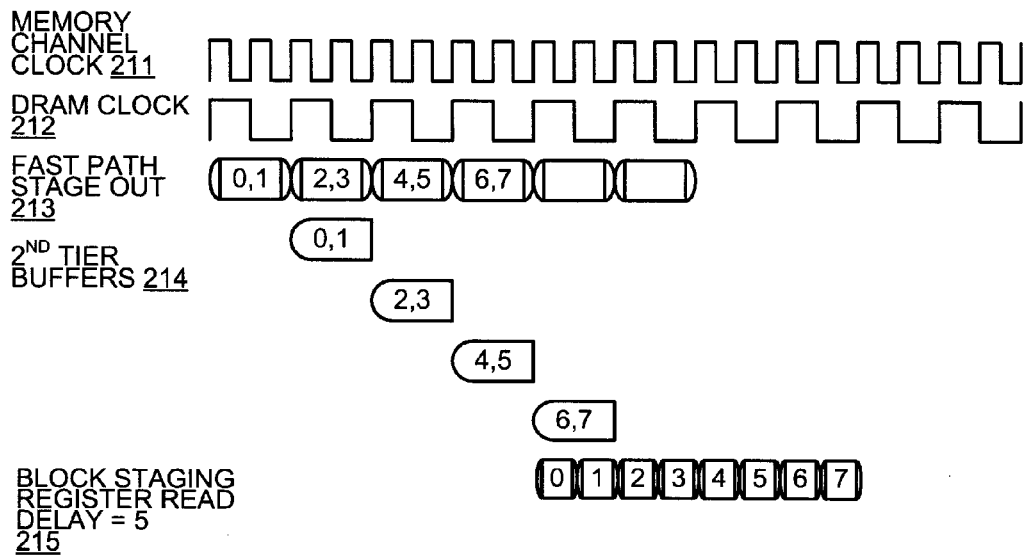

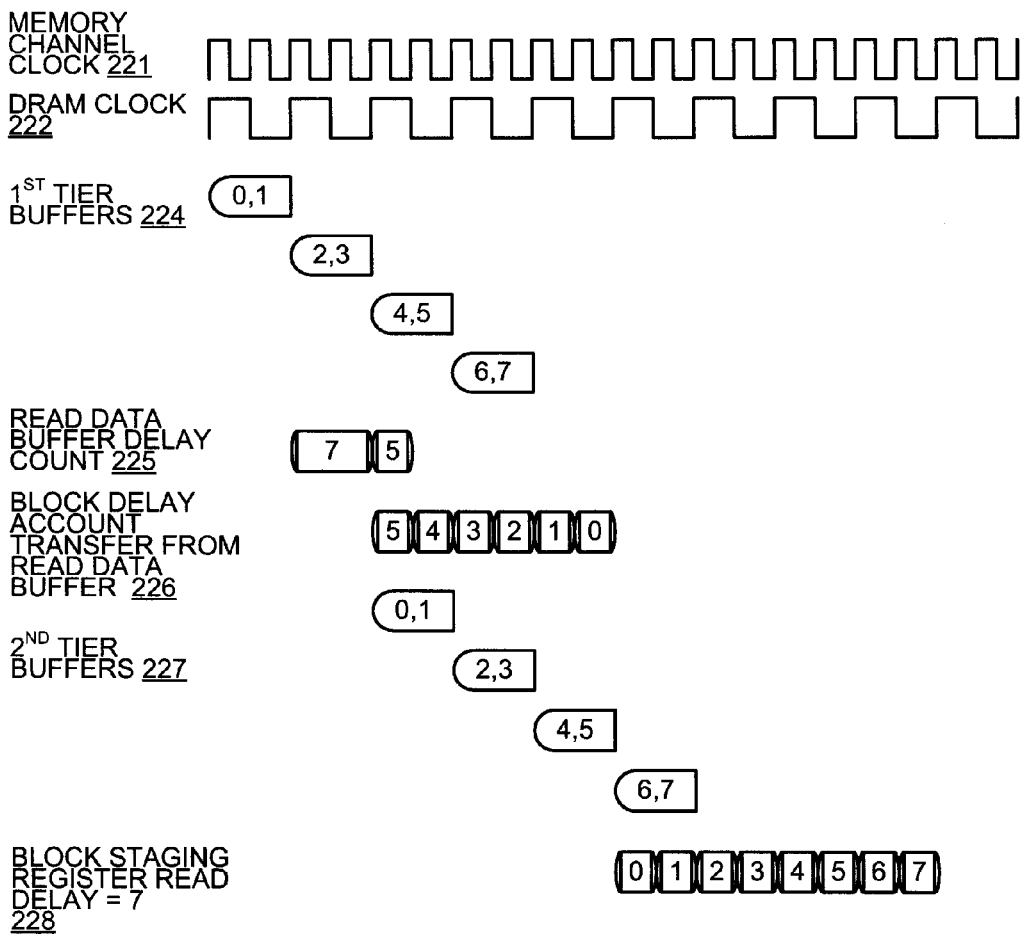

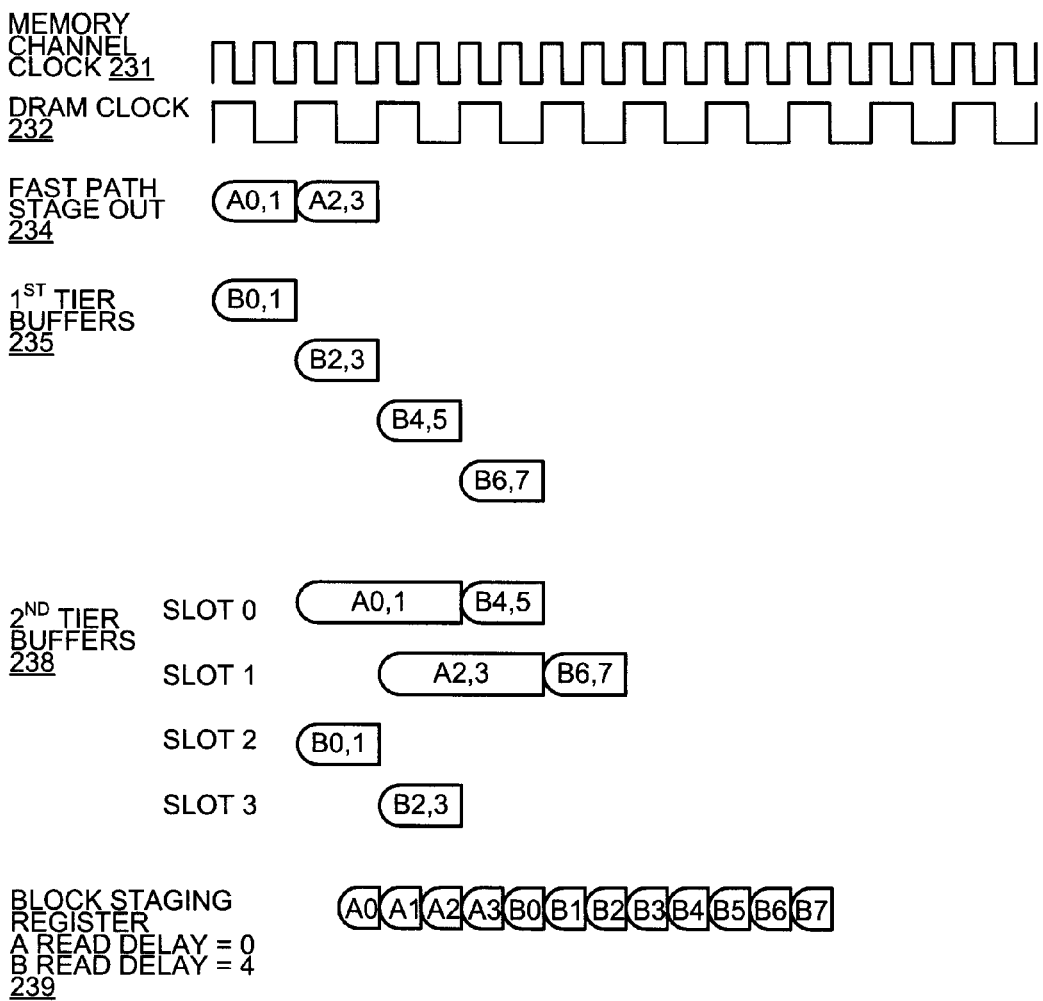

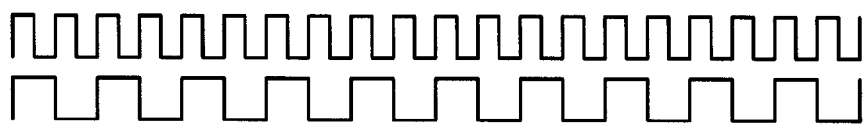

SYSTEM AND METHOD FOR A HIERARCHICAL BUFFER SYSTEM FOR A SHARED DATA BUS

BACKGROUND OF THE INVENTION

1. Field of the Invention

The present invention generally relates to controlling moving data entries in a hierarchical buffer system.

2. Description of Background

Currently, modern computer systems typically contain several integrated circuits (ICs), including a processor which may be used to process information in the computer system. The data processed by a processor may include computer instructions which are executed by the processor as well as data which is manipulated by the processor using the computer instructions. The computer instructions and data are typically stored in a main memory in the computer system.

Processors typically process instructions by executing the instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction. In some cases, the pipeline (in addition to other circuitry) may be placed in a portion of the processor referred to as the processor core. Some processors may have multiple processor cores, and in some cases, each processor core may have multiple pipelines. Where a processor core has multiple pipelines, groups of instructions (referred to as issue groups) may be issued to the multiple pipelines in parallel and executed by each of the pipelines in parallel.

As the number of processing cores increases, it places more demand on the memory subsystem to deliver the required bandwidth of data. Since there is a practical limit to the number of channels a processor can directly attach to memory devices, a common architectural solution involves one or more memory buffer chips present on the channel. A primary role of the buffer chip is to forward a stream of read operations to a plurality of ranks and banks, attached to one or more memory ports, and buffer the returning read data for transmission back to the processor cores. Often the DRAM frequency differs from the memory channel frequency, and this necessitates buffering and speed matching of the returning data.

As the number of read buffers increase, along with the operating frequency of the buffer chip itself, a new problem emerges. The multiplicative product of the number of data bursts with the number of outstanding read requests, results in the number of data sources which needs to be multiplexed onto the memory channel. For example, a buffer chip with 4 read buffers, each capable of holding a burst length 8 (i.e. BL8) DRAM read, results in 32 bursts of data which must be delivered to the memory channel. With channel frequencies surpassing 2 GHz, the buffer data flow now exceeds 1.5 GHz cycle times.

Furthermore, high performance processors are capable of generating continuous read streams which require the buffer chip to support some number of outstanding reads greater than the actual number of physical read buffers. For instance, if the buffer chip has 4 read buffers, the sophisticated scheduling schemes employed by the memory controller will typically launch a 5th read before the 1st read departs the buffer chip. This exploits the known fixed latencies in the memory channel, buffer chip and DRAM devices to pipeline additional read operations and stress the buffers.

The simplest (i.e. brute force) solution is to overdesign the buffer chip data flow and instantiate additional buffers. By using simple round robin schemes, the buffer management logic is easy to implement, but at a physical design cost of additional real estate. This creates a huge problem if the data sources are scattered around the chip. This would necessitate adding pipelining stages just to transport the data either to or from the buffer pool. This approach would also aggravates the problem of having to select from all of the data sources by introducing even more sources into the data flow muxing.

The more common approach is to only employ the required number of buffers (4 in this example), but to use a more sophisticated buffer controller which supports pipelining. As data is being read out of the first buffer, the returning DRAM data from the 5th read simultaneously begins loading into the first buffer. Then the returning data from a 6th read can pipeline into the second buffer and so on. This solution permits the memory controller to send a continuous read stream, and depending on the ratio of the DRAM frequency to the channel frequency, a sustained bandwidth of twice the number of actual read buffers can typically be achieved. However, the problem of outgating 32 sources still remains. With data flows running at 1-2 GHz, this often requires additional pipelining stages between the buffer pool and the memory channel. Unfortunately, this method impacts the latency of the start of data delivery.

SUMMARY OF THE INVENTION

Embodiments of the present invention provide a system and method for controlling data entries in a hierarchical buffer system. Briefly described, in architecture, one embodiment of the system, among others, can be implemented as follows.

The system includes an integrated circuit device comprising: a memory core, a shared data bus and a plurality of 1st tier buffers that receive data from the memory. The system further includes a 2nd tier transfer buffer that delivers the data onto the shared data bus with pre-determined timing.

Embodiment of the present invention can also be viewed as providing methods for controlling data entries in a hierarchical buffer system. In this regard, one embodiment of such a method, among others, can be broadly summarized by the following steps. The method includes managing the buffers to allow data to flow from a plurality of 1st tier buffers through a 2nd tier transfer buffer, and delivering the data onto a shared data bus with pre-determined timing.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the embodiment of the present invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 a flow chart illustrating an example of the operation of a hierarchical buffer system according to one embodiment of the invention FIGS. 4A-E are timing diagrams depicting examples is of the operation of a hierarchical buffer system.

Figure 1:
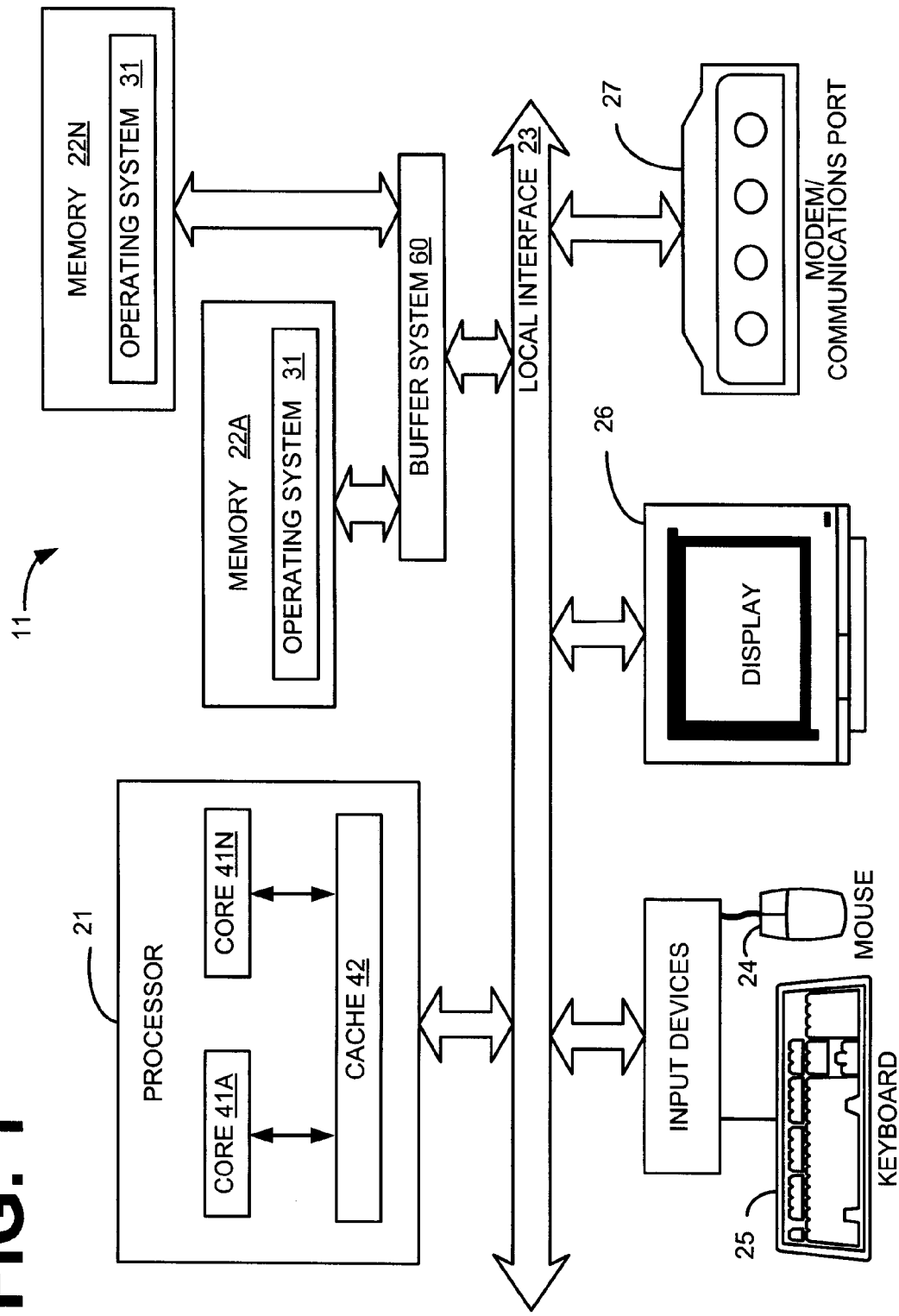
FIG. 1 is a block diagram depicting a system according to one embodiment of the invention.

The detailed description explains the preferred embodiments of the invention, together with advantages and features, by way of example with reference to the drawings.

DETAILED DESCRIPTION OF THE INVENTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether a particular advantage is achieved by a given embodiment is not limiting of the invention. Thus, the following aspects, features, embodiments and advantages are merely illustrative and are not considered elements or limitations of the appended claims except where explicitly recited in the claim(s). Likewise, reference to "the invention" shall not be construed as a generalization of any inventive subject matter disclosed herein and shall not be considered to be an element or limitation of the appended claims except where explicitly recited in a claim(s).

One embodiment of the present invention addresses both problems by employing a cascaded buffer structure wherein the $1^{st}$ tier comprises three buffers, while the second tier holds the fourth buffer. A sophisticated buffer controller supports two levels of data pipelining. The first level entails data movement from one of the three holding buffers to the second tier transfer buffer. The second level of pipelining occurs within a given buffer to allow data associated with one transaction to begin unloading while data for a second transaction simultaneously loads into the buffer. This approach reduces the final outgating multiplexer or mux to a maximum of 8 sources for a burst length 8 read operation, and further reduces the number of required pipelining stages to transmit the data on the channel.

In order to match the sustained bandwidth of a traditional design employing the traditional parallel buffer pool, another embodiment of the present invention further contemplates a flow controller which forwards data bursts from the $1^{st}$ tier of holding buffers to the second tier transfer buffer in advance of their scheduled time slice on the memory channel. Therefore, in cases where multiple reads are issued in close succession, the one embodiment of the present invention incorporates a read transfer buffer which also acts as a speed matching buffer to ensure the data for subsequent read transactions returns in a gapless fashion.

One embodiment of the present invention comprises an innovative read transfer buffer which dynamically transforms between a 4-slot first-in first-out buffer (i.e. FIFO or queue), a dual port 2-slot FIFO buffer and a simple staging register. This structure allows for a minimal latency initial data transfer when no buffering is required, as well as the accommodation of 4 and 8 burst read operations, issued in any sequence. Since a double-data-rate three synchronous dynamic random access memory (DDR3 DRAM) introduces gaps between two successive burst chop 4 read operations, DDR memory devices typically support two types of data transfers. A burst chop is when a data transaction size is one half of the capacity of a buffer. A burst length 8 transfers 8 beats of data on each rising and falling edge of 4 successive memory clock periods. The preferred embodiment employs this type of transfer for accessing an entire cache line from memory. Additionally, DDR devices also permit a burst length 4 or dynamic burst chop operation wherein only 4 beats of data are delivered by the device. In situations where a processor only requires a partial cache line, the present invention permits half of the $1^{st}$ and $2^{nd}$ tier buffers to be used for housing the returning data. Furthermore, the $2^{nd}$ tier buffer provides a means by which data from two different transactions can be simultaneously loaded into each half of the $2^{nd}$ tier buffer to ensure seamless data transfers on the shared bus.

The dual port read transfer buffer of one embodiment of the present invention eliminates these gaps and permits the four data shots from the second transaction to transfer immediately following the four data shots from the first transaction in situations where data from both transactions are available. One benefit of this is for timing closure that improves or maintains maximum bandwidth. However, if the two burst chop 4 transactions occur sequentially on the same DRAM port and the first was not delayed in the $2^{nd}$ tier buffer, then there may still be a gap on the shared data bus after the end of the $1^{st}$ and start of the $2^{nd}$ transaction.

However, there is also the underlying aspect of floor planning. The aims of an optimal floor plan are a total chip area which is as small as possible and short delay times, (i.e. short connecting wires between the cells). Again when considering an example, having 16 or 32 buffers that need to funnel down to some output channel, the traditional approach would be to try to clump them together to have any hope of closing timing. However, this creates a huge problem if the data sources are scattered around the chip. This would necessitate adding pipelining stages just to transport the data either to or from the buffer pool. Every transfer incurs that extra latency, even transactions that sat in a buffer for 100 cycles waiting for their turn on the output channel.

The tiered structure of one embodiment of the present invention enables the optimization of the floorplan for a circuit. Consider having those 32 $1^{st}$ tier organized as 4 pools of 8 buffers wherein each pool is located near a corner of a chip. Now, funnel the 4 pools to two $2^{nd}$ tier buffers each of which may be located at a midpoint in the path. Finally, the two $2^{nd}$ tier buffers can get multiplexed or muxed down to a single 3rd tier buffer which is located at the output channel. This essentially hides the chip propagation delay as part of the reload manager moving data in the background. One embodiment of the present invention is a way to minimize the impact of the buffers on a critical path so that one can focus propagation delay efforts on the low-latency (fast) path.

Embodiments of the invention may be utilized with and are described below with respect to a system, e.g., a computer system. As used herein, a system may include any system utilizing a processor and a memory, including a mainframe, server, personal computer, internet appliance, digital media appliance, portable digital assistant (PDA), portable music/video player and video game console. While memories may be located on the same die as the processor which utilizes the memory, in some cases, the processor and memories may be located on different dies (e.g., separate chips within separate modules or separate chips within a single module). Alternative embodiments of the invention may be utilized with network routing, graphic card memory management, cache hierarchy and the like.

While described below with respect to a processor having multiple memories, wherein each processor core uses multiple pipelines to execute instructions, embodiments of the invention may be utilized with any processor which utilizes a memory, including processors which have a single processing core. In general, embodiments of the invention may be utilized with any processor and are not limited to any specific configuration.

FIG. 1 is a block diagram illustrating an example of a computer 11 utilizing one embodiment of the present invention for a hierarchical buffer system. Computer 11 includes, but is not limited to, mainframes, servers, PCs, workstations, laptops, PDAs, palm devices and the like. Generally, in terms of hardware architecture, as shown in FIG. 1, the computer 11 include a processor 21, memory 22, and one or more input and/or output (I/O) devices (or peripherals) that are communicatively coupled via a local interface 23. The local interface 23 can be, for example but not limited to, one or more buses or other wired or wireless connections, as is known in the art. The local interface 23 may have additional elements, which are omitted for simplicity, such as controllers, buffers (caches), drivers, repeaters and receivers, to enable communications. Further, the local interface 23 may include address, control and/or data connections to enable appropriate communications among the aforementioned components.

The processor 21 is a hardware device for executing software that can be stored in memory 22. To provide for faster access to data and instructions, as well as better utilization of the processor 21, the processor may have multiple processor cores 41. The processor 21 may retrieve data from memory 22 through local interface 23.

The processor 21 can be virtually any custom made or commercially available processor, a central processing unit (CPU), data signal processor (DSP) or an auxiliary processor among several processors associated with the computer 11, and a semiconductor based microprocessor (in the form of a microchip) or a macroprocessor. Examples of suitable commercially available microprocessors are as follows: a PowerPC or Cell BE microprocessor or Z-Series processors from IBM, U.S.A., an 80×86 or Pentium series microprocessor from Intel Corporation, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A. The memory elements 22(A-N) may be replicated. In one embodiment, the memory elements 22(A-N) interface with a memory buffer chip comprising the buffer management facilities in the hierarchical buffer system 60 of the present invention. The memory buffer chips are configured in a daisy chain topology wherein every memory transaction is forwarded through each memory buffer chip and the returning memory read data shares a single upstream data path which also passes through each memory buffer chip. This topology allows for easy memory expansion by connecting additional 2-port memory buffer chips in a daisy-chained fashion.

The memory 22 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), flash, programmable read only memory (PROM), tape, compact disc read only memory (CD-ROM), disk, diskette, cartridge, cassette or the like, etc.). Moreover, the memory 22 may incorporate electronic, magnetic, optical, and/or other types of storage media. Note that the memory 22 can have a distributed architecture of memory elements 22(A-N), where various components are situated remote from one another, but can be accessed by the processor 21.

An alternate embodiment is also contemplated wherein a plurality of memory elements 22(A-N) is directly attached to the local interface 23 with the hierarchical buffer system 60. The hierarchical buffer system 60 employs the concept of Read Data Buffer Delay to schedule the precise timing of each returning data transaction and manage the memory data transactions from a plurality of memory elements 22(A-N) in a distributed fashion. The hierarchical buffer system 60 of the present invention requires no explicit communication between the hierarchical buffer systems 60 contained within the plurality of memory elements 22(A-N).

The software in memory 22(A-N) may include one or more separate programs, each of which comprises an ordered listing of executable instructions for implementing logical functions. In the example illustrated in FIG. 1, the software in the memory 22(A-N) includes a suitable operating system (O/S) 31. The operating system 31 essentially controls the execution of other computer programs, and provides scheduling, input-output control, file and data management, memory management, and communication control and related services.

A non-exhaustive list of examples of suitable commercially available operating systems 31 is as follows (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a Linux operating system, which is freeware that is readily available on the Internet; (e) z/OS™ or z/VM™ operating systems available from IBM Corporation; (f) a run time Vxworks operating system from WindRiver Systems, Inc.; or (g) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation).

The I/O devices may include input devices, for example but not limited to, a mouse 24, keyboard 25, scanner (not shown), microphone (not shown), etc. Furthermore, the I/O devices may also include output devices, for example but not limited to, a printer (not shown), display 26, etc. Finally, the I/O devices may further include devices that communicate both inputs and outputs, for instance but not limited to, a NIC or modulator/demodulator 27 (for accessing remote devices, other files, devices, systems, or a network), a radio frequency (RF) or other transceiver (not shown), a telephonic interface (not shown), a bridge (not shown), a router (not shown), etc.

If the computer 11 is a PC, workstation, intelligent device or the like, the software in the memory 22 may further include a basic input output system (BIOS) (omitted for simplicity). The BIOS is a set of essential software routines that initialize and test hardware at startup, start the operating system 31, and support the transfer of data among the hardware devices. The BIOS is stored in some type of read-only-memory, such as ROM, PROM, EPROM, EEPROM or the like, so that the BIOS can be executed when the computer 11 is activated.

When the computer 11 is in operation, the processor 21 is configured to execute software stored within the memory 22, to communicate data to and from the memory 22, and to generally control operations of the computer 11 are pursuant to the software. The operating system 31 and any other program are read, in whole or in part, by the processor 21, perhaps buffered within the processor 21, and then executed.

Figure 2:
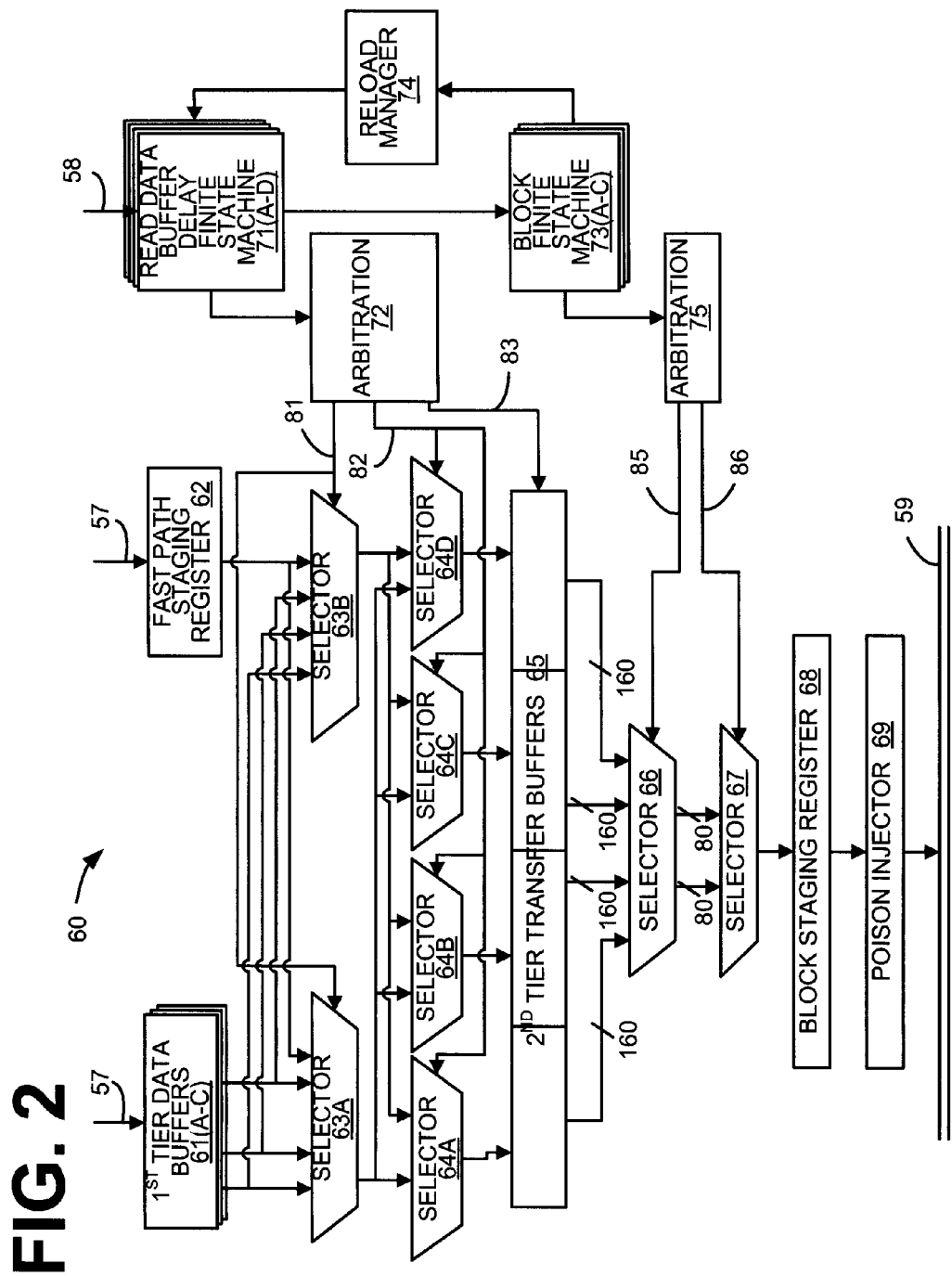
FIG. 2 is a block diagram depicting an example of the architecture of a hierarchical buffer system according to one embodiment of the invention.

FIG. 2 is a block diagram depicting an example of the architecture of a hierarchical buffer system 60 according to one embodiment of the invention. For simplicity, FIG. 2 depicts and is described with respect to a hierarchical buffer system 60, memory 22 (A-N.) and the local interface 23. In an alternative embodiment, the hierarchical buffer system 60 is positioned between the cache memory 42 and a single processor core 41 of the processor 21. In one embodiment, each processor core 41 may be identical (e.g., contain identical hierarchical buffer systems 60). In another embodiment, each processor core 41 may share a single hierarchical buffer system 60.

The movement of data from the $1^{st}$ tier data buffers 61(a-c) onto a memory data channel 59 (i.e. local interface 23) is though the $2^{nd}$ tier transfer buffer 65. In the preferred embodiment, memory data channel 59 could be any data bus. Memory data channel 59 can be just a shared data bus back to any unit requesting data. The unit requesting data can be for example but not limited to, a processor unit, another storage unit, a peripheral and the like. The movement of data is managed by a number of control finite state machines working together. The $1^{st}$ tier data buffers 61(a-c) is controlled by the read data buffer delay finite state machine 71(a-c), which manages the unloading of read data from the $1^{st}$ tier data buffers 61(a-c) into the $2^{nd}$ tier transfer buffer 65 using hierarchical selectors 63(a-b) and selectors 64(a-d). In the illustrated example implementation, three read data buffer delay finite state machines 71(a-c) are utilized, one for each physical $1^{st}$ tier data buffer 61(a-c) and a fourth read data buffer delay finite state machine 71d. The fourth read data buffer delay finite state machine 71d manages the read data traffic into the $2^{nd}$ tier transfer buffer 65 in situations where the read data circumvents the $1^{st}$ tier data buffers 61(a-c) and is loaded directly into the $2^{nd}$ tier transfer buffer 65 from the fast path staging register 62. This "flush" path will be described below.

The three read data buffer delay finite state machines 71(a-c) are each tied to a specific $1^{st}$ tier data buffer 61(a-c) and control unloading data from that $1^{st}$ tier data buffer 61(a-c). The control of unloading data from that $1^{st}$ tier data buffer 61(a-c) into the $2^{nd}$ tier transfer buffer 65, is provided by controller signals 81 and 82 from arbitration block 72 for hierarchical selectors 63(a-b) and selectors 64(a-c). The control of loading data to the $2^{nd}$ tier transfer buffer 65 is provided by signal 83. In the preferred embodiment, arbitration block 72 just OR's the control signals from each read data buffer delay finite state machines 71(a-c) together to form the control signals out to the hierarchical selectors 63(a-b), selectors 64(a-d), and $2^{nd}$ tier transfer buffer 65. In the preferred embodiment, there is no priority built into one read data buffer delay finite state machines 71(a-c) controls vs. another. However, in alternative embodiments, a priority is added to read data buffer delay finite state machines 71(a-c) for additional protections. The arbitration block 72 also performs error detection functions to check that that prevent read data buffer delay finite state machines 71(a-c) from trying to load data to the $2^{nd}$ tier transfer buffer 65 simultaneously creating data collisions.

In the preferred embodiment, read data buffer delay finite state machines 71(a-d) operate at the DRAM clock frequency and manage delays in DRAM clock increments. The read data buffer delay finite state machines 71(a-d) operate such that they can simultaneously unload data to the $2^{nd}$ tier transfer buffer 65 as new read data transfer is loaded into the available $1^{st}$ tier data buffer 61(a-c). In the preferred embodiment, this is accomplished by utilizing a queue system within each read data buffer delay finite state machine 71(a-c) to track the current and future buffer wait time and data burst length of each read data transfer in the $1^{st}$ tier data buffer 61(a-c). The queues are used because multiple read requests can be issued to the system before the data for the $1^{st}$ request is received. The read data buffer delay finite state machines 71(a-d) store the information for the subsequent requests while it is waiting to process or processing the first request. When the first request is completed, the next request is acquired from the front of the queue, if it exists.

Once the data is unloaded from a $1^{st}$ tier data buffer 61(a-c), control is passed from the read data buffer delay finite state machines 71(a-d) to one of three data block controllers (i.e. block finite state machines 73(a-c)) which manage the data within the $2^{nd}$ tier transfer buffer 65 and control the serialization of data to the block staging register 68. The block finite state machines 73(a-c), like the read data buffer delay finite state machines 71(a-d), are capable of managing the read data buffer delay while the data is in the $2^{nd}$ tier transfer buffer 65 and unloading the data onto the memory data channel 59 at a specific time to prevent data collisions on the shared channel between selector 66 and selector 67. This not only prevents collisions between selector 66 and 67, but the use of the read data buffer delay finite state machines 71(a-d) also prevent collisions on the shared bus between a plurality of buffer controllers, for example between multiple memory buffer chips. The arbitration 75 is managed by the block finite state machines 73(a-c) and controls selector 66 and selector 67. The number of block finite state machines 73(a-c) in use is related to the number of $1^{st}$ tier data buffers 61(a-c) implemented. In the illustrated example, three block finite state machines 73(a-c) operate in a round-robin fashion and are not tied to a specific $1^{st}$ tier data buffer 61(a-c). Each of the three block finite state machines 73(a-c) can independently control the serialization of data from the $2^{nd}$ tier transfer buffer 65 onto the memory data channel 59. As such, care must be taken to detect and avoid collisions when unloading from the three $1^{st}$ tier data buffers 61(a-c) into the $2^{nd}$ tier transfer buffer 65. The read data buffer delay finite state machines 71(a-d) can for a given transaction, pass coordination signals to the data block controllers (i.e. block finite state machines 73(a-c) to detect and avoid collisions between the $2^{nd}$ tier transfer buffer 65 and block staging register 68.

The data in the block staging register 68 is then moved through the poison injector 69 before being deposited on the memory data channel 59. In the event of an error situation, the hierarchical buffer system 60 uses a special cyclic redundancy code (CRC) to communicate back to the host that a malfunction has occurred and the requested read data is not forthcoming. This permits the host to attempt a recovery procedure such as reissuing the failed read command or alerting the operating system to deallocate memory space and redirect future reads to other physical memory locations. In the preferred embodiment, the hierarchical buffer system 60 employs an 80 bit wide data block on the memory data channel 59 (59). Two consecutive 80 bit blocks represent a single frame. Of those 160 bits, 144 are actual memory data while the remaining 16 are used for a cyclic redundancy code (CRC). CRC is well known in the art, and there are numerous codes that can be applied to protect a 144 bit transmission. The preferred embodiment employs a code that is able to detect any single solid lane failure, and any random bit flips within the frame, up to 4 bits. An 80 bit block of all zeros is considered a valid idle pattern. By alternatively inverting the first and last bits of the two 80 bit blocks within a frame, this creates a poison CRC code. A poison CRC is a special pattern such that if a transmission error occurs, the bit flip will result in a true CRC error. Thus, the poison CRC code can be used as a message to indicate to the host that a problem has occurred, and the read command was unable to be successfully processed.

The hierarchical buffer system 60 employs a poison injector 69 with corresponding facilities that monitor error indicators within the hierarchical buffer system 60. Upon detection of error indicators, the poison injector 69 intercepts any pending transfers from the block staging register 68 and overlays the existing 80 bit data pattern with the poison CRC pattern. Furthermore, the hierarchical buffer system 60 contains frame boundary detection logic which ensures the poison injection always begins at the start of a new frame. The CRC code employed in one embodiment is such that a random data pattern in the first 80 bit block, followed by a poison CRC pattern in the second 80 bit block, has a statistical chance of producing 160 bits of data which appear to be valid data with good CRC. In order to prevent any possibility from the host being misled into believing the received frame contains valid data, the hierarchical buffer system 60 will allow a frame that's in the middle of a transfer to complete. At the next frame boundary, the poison injector 69 will overlay the poison pattern and alert the unit requesting data to the malfunction. The preferred embodiment employs a system-wide recovery policy which allows for a command retry queue of sufficient depth to permit the poison injector 69 to wait for the next frame boundary to insert the poison CRC pattern.

The use of the block finite state machines 73($a$-$c$) allows for various clock ratios (i.e. gear ratios) to be used between the DRAM data loading into the $1^{st}$ tier data buffers 61($a$-$c$), $2^{nd}$ tier transfer buffer 65 and the unloading from the $2^{nd}$ tier transfer buffer 65 onto the memory data channel 59. In the preferred embodiment, the block finite state machines 73($a$-$c$) operate at a higher clock frequency than the read data buffer delay finite state machines 71($a$-$d$) and allow for sub-DRAM clock cycle read buffer delay to be used to provide gapless transitions between independent read data transfers. In an alternative embodiment, the block finite state machines 73($a$-$c$) operate at a clock frequency of the read data buffer delay finite state machine 71.

The third controller used in the data transfer is the reload manager 74, which is responsible for monitoring the $2^{nd}$ tier transfer buffer 65 and signaling to the read data buffer delay finite state machines 71($a$-$d$) that the $2^{nd}$ tier transfer buffer 65 has become available for use and may be loaded with data from the $1^{st}$ tier data buffer 61($a$-$c$). This "early" unload allows the $1^{st}$ tier data buffer 61($a$-$c$) to be freed up as soon as possible for subsequent data and ensures the $2^{nd}$ tier transfer buffer 65 is fully utilized. To aid in the tracking of individual read data operations through the data flow, and to prevent the unloading of $1^{st}$ tier data buffers 61($a$-$c$) in the incorrect order, each read data transfer is assigned an id. The reload manager 74 tracks which read ids have been unloaded and which are the next to unload from each $1^{st}$ tier data buffer 61. When the read data buffer delay finite state machine 71 transfers control to the block finite state machines 73($a$-$c$), this id is also transferred. When the block finite state machines 73($a$-$c$) signal the reload manager 74 that the $2^{nd}$ tier transfer buffer is unloaded, the transfer id is communicated as part of this signaling so that the reload manager 74 can update its information on which is the next transfer id that should be moved into the $2^{nd}$ tier transfer buffer 65, and signal the correct read data buffer delay finite state machine 71($a$-$d$) accordingly.

In one embodiment of the invention, a fast path staging register 62 is shown to close timing. In a preferred embodiment, the fast path staging register 62 is a staging register. In an alternative embodiment, the system and method providing a hierarchical buffer system 60 operate efficiently if the fast path staging register 62 is missing and data goes straight from the source domain 57 to the $2^{nd}$ tier transfer buffer 65. In still another alternative embodiment, the system and method providing a hierarchical buffer system 60 utilize multiple fast path staging registers 62 in order to close timing.

To unload the $1^{st}$ tier data buffers 61($a$-$c$) early, the hierarchical buffer system 60 utilize a reload manager 74. The reload manager 74 entity actively manages the flow of the data from the $1^{st}$ tier data buffers 61($a$-$c$) to the $2^{nd}$ tier transfer buffer 65 to ensure the data is ready in the $2^{nd}$ tier transfer buffer 65 when its turn comes to go out on the memory data channel 59. This is a key differentiator from prior art which would typically operate in one of three ways depending on the data structure: (a) simply let the data sit in the $1^{st}$ tier data buffers 61($a$-$c$) until the delay expires (reaches 0). This is called passive buffer pipelining because even if room is available in the $2^{nd}$ tier transfer buffer 65, it still waits around until the delay expires before data moves. (b) Wait until the $2^{nd}$ tier transfer buffer 65 empties and then move the data from the $1^{st}$ tier data buffers 61($a$-$c$) to the $2^{nd}$ tier transfer buffer 65. This method does not rely on a delay timer at all. This can't work in an architecture that has a required delivery time on the data. It can only be used in environments where the data either moves asynchronously or in a structure like the prior art. In other words, one time the $2^{nd}$ tier transfer buffer 65 might free up in 5 cycles and then the data moves from the $1^{st}$ tier data buffers 61($a$-$c$). However, the next time, it might take 50 cycles to free up, but the system architecture doesn't care about that variable time, it just requires that things are done in order. (c) Use a combination of (a) and (b) to try to move the data to the $2^{nd}$ tier transfer buffer 65 early if the $2^{nd}$ tier transfer buffer 65 empties prior to the delay expiring, but if it doesn't, then revert back to a passive mode of operation and just wait until the delay expires. The problem with this is depending on the sequence of reads, and their associated transfer lengths, there would be cases where it fails to adhere to the gapless transfer rule which states that once data has been buffered, and begin transmitting back to the host, the transmission of all remaining data would be gapless and occur on the correct cycle.

FIG. 3 is a flow chart illustrating an example of the operation of a hierarchical buffer system 60 according to one embodiment of the invention The flow chart shows the control path for data as it is moved though the buffer hierarchy. The flow chart demonstrates the possible data paths for a single transaction (i.e. burst length 8 or 4) based on the predetermined read delay, buffer availability, and transaction size.

At step 101, the hierarchical buffer system 60 calculates the precise delivery time for which the first burst of data must be returned on the memory data channel 59. The preferred embodiment employs a method consisting of initial frame latency (IFL) which denotes the total propagation time from command launch to arrival of the leading data burst as seen by the requestor. This round trip delay is computed once during a system initialization sequence and stored locally for reference. During windows of bus inactivity, where no buffering is required, the initial frame latency establishes the baseline for a counter that is further adjusted to account for DRAM access times and internal latencies within the data flow. The counter is loaded at the time the read command is received, and begins to decrement. The counter denotes the remaining time until the first burst of data must be transmitted on the memory data channel 59.

Any subsequent read commands that arrive in close proximity to the initial read command will incur additional delay while waiting for the memory data channel 59 to become available. This additional delay is determined by comparing the value of the current transaction's counter to the established baseline. The difference denotes the amount of time that the second transaction must be buffered to wait for the memory data channel 59 to become available. It should also be noted that this read data buffer delay computation further includes an adjustment to account for the burst length of the upstream transfer since the transfer will busy the memory data channel 59 for a plurality of cycles. Subsequent read requests that require buffering (i.e. have positive read data buffer delay) will also have counters that decrement the read data buffer delay count with each passing cycle. As data is moved from $1^{st}$ tier buffers to $2^{nd}$ tier buffers, the remaining read data buffer delay is also passed between the read data buffer delay finite state machines 71(A-D) and the block finite state machines 73(A-D).

Finally, in the case of a daisy chained topology, the hierarchical buffer system 60 may receive a read request for one memory element 22A while a second memory element 22N is currently busying the memory data channel 59. In this situation, the hierarchical buffer system 60 also contains facilities to store the initial frame latency for each memory element 22(A-N) attached to the daisy chain, such that each instance of the hierarchical buffer system 60 may compute and track the delivery times of all outstanding transactions in a distributed fashion without the need for any intercommunication between each memory element 22(A-N). In this way, the hierarchical buffer system 60 manages the second read request and would snoop the first read request, understanding that the hierarchical buffer system 60 is targeting the other (remote) memory source, compute the delivery time for the first request, and then apply this to the second request delivery time calculation as read data buffer delay. Therefore, read data buffer delay is determined as the amount of time data that one transaction must be buffered to await memory data channel 59 availability either due to a local or remote resource utilizing the channel. The method for computing the precise delivery time is described for purposes of illustrating a means of establishing a read data buffer delay for the read data buffer delay finite state machines 71(A-D) and the block finite state machines 73(A-D). The apparatus and method for computing the precise delivery time is described in commonly assigned and co-pending U.S. Patent Application entitled "Automatic Read Data Flow Control In A Cascade Interconnect Memory System", Ser. No. 12/166,226 filed on Jul. 1, 2008. It is understood that other means exist to establish a precise delivery time for a shared data bus, and the present invention does not preclude the use of means beyond those described herein. One example of an alternate embodiment is the use of a field within the read command which dictates the required delivery time for the transaction. This approach allows a bus or memory controller to establish a particular flow control and bus utilization. Regardless of the method used to calculate the delivery time, and any associated read data buffer delay, our invention contemplates the use of this element to control the movement of the data through the hierarchical buffer system 60.

At step 103, the hierarchical buffer system 60 waits to receive data requested by a processor 21. Once data requested by a processor 21 has been received, each transaction is assigned an ID and then the hierarchical buffer system 60 checks to see if the delay count is less than the blocks per DRAM cycle count at step 105. If it is determined at step 105 that the delay count is less than the blocks per DRAM cycle count then the operation of the hierarchical buffer system 60 skips to step 127. However, if it is determined at step 105 that the delay count is not less than the blocks per DRAM cycle count, the hierarchical buffer system 60 then determines if the $2^{nd}$ tier transfer buffer 65 is available at step 107. If it is determined at step 107 that the $2^{nd}$ tier transfer buffer 65 is available, then the operation of the hierarchical buffer system 60 skips to step 125. However, if it is determined that the $2^{nd}$ tier transfer buffer 65 is not available, then the hierarchical buffer system 60 stores the data in the $1^{st}$ tier data buffer 61(a-c), at step 109. This assumes that there is a $1^{st}$ tier data buffer 61(a-c) available, otherwise there is a buffer overflow condition At step 111, it is determined if the $2^{nd}$ tier transfer buffer 65 is full. If it is determined that the $2^{nd}$ tier transfer buffer 65 is full, then the hierarchical buffer system 60 skips to step 117. However, if it is determined at step 111 that the $2^{nd}$ tier transfer buffer 65 is not full, then it is determined at step 113 if the next data transaction in the sequence in the $1^{st}$ tier data buffer 61(a-c) is a burst chop. Data in the $1^{st}$ tier data buffer 61(a-c) is burst chop when the data transaction size is one half of the capacity of a $1^{st}$ tier data buffer 61(a-c) or the $2^{nd}$ tier transfer buffer 65. In this case the buffer is one half (½) full. If it is determined at step 113 that the data in the $1^{st}$ tier data buffer 61(a-c) is burst chop, then the operation of the hierarchical buffer system 60 skips to step 119. However, if it is determined at step 111 that the data in the $1^{st}$ tier data buffer 61(a-c) is not burst chop, then the operation of the hierarchical buffer system 60 is delayed at step 115 just prior to the $2^{nd}$ tier transfer buffer 65 unload time. It is the read data buffer delay finite state machine 71(a-c) and arbitration block 72 that performed this delay. In the preferred embodiment the block finite state machines 73(A-D) performs the delay by varying when to signal to the reload manager 74 that it is emptying the $2^{nd}$ tier buffer onto the shared data bus 59 based on the contents of the next-in-line transaction. The reload manager 74 issues the request to unload the $1^{st}$ tier data buffer 61(a-c) early at different times depending on whether the $2^{nd}$ tier transfer buffer 65 is half full or completely full. The operation of the hierarchical buffer system 60 then skips the step 119.

At step 117, the operation of the hierarchical buffer system 60, delays unloading data from the $1^{st}$ tier data buffers 61(a-c) into the $2^{nd}$ tier transfer buffer 65, until the $2^{nd}$ tier transfer buffer 65 actively begins unloading data to the memory data channel 59. Once data is in the $1^{st}$ tier data buffers 61(a-c) there are 2 ways preferred ways it can be moved to the $2^{nd}$ tier transfer buffer 65. In the first preferred method, the read data buffer delay finite state machines 71(a-c) count expires naturally (i.e., the count goes below the read data buffer delay steps per DRAM clock cycle threshold. In the second preferred method, the reload manager 74 indicates that the $2^{nd}$ tier transfer buffer 65 is available and can be loaded. If this "early" indication occurs, it will be before the count expires naturally. This signal to unload the $1^{st}$ tier data buffers 61(a-c) into the $2^{nd}$ tier transfer buffer 65 will occur at 2 different times depending on the current contents of the $2^{nd}$ tier transfer buffer 65. If the $2^{nd}$ tier transfer buffer 65 is holding a half-blocked (i.e. a BL4) transaction, then that means there are 2 free slots available in the $2^{nd}$ tier transfer buffer 65 and the reload manager 74 can signal its early unload a few cycles sooner from the $1^{st}$ tier data buffers 61(a-c) than if the $2^{nd}$ tier transfer buffer 65 were completely full. This is because the 2 empty $2^{nd}$ tier transfer buffer 65 slots can start being filled before any data actually starts unloading from the other 2 full $2^{nd}$ tier transfer buffer 65 slots. In the $2^{nd}$ tier transfer buffer 65 is full case, the hierarchical buffer system 60 must wait until the 1st tier data buffers 61(a-c) slot has been unloaded at least before filling it with new 1st tier data buffers 61(a-c) data.

The transaction ID assigned at step 103, is used along with the read data delay to ensure transactions are processed in a sequential manner and that the 1st tier data buffers 61(a-c) are processed in a round-robin fashion. The reload manager 74 maintains a running tally of the next-to-unload transaction ID to be loaded into the $2^{nd}$ tier transfer buffer 65. When the read data buffer delay finite state machines 71(a-c) unload their data into the $2^{nd}$ tier transfer buffer 65 they indicate the transaction ID to the reload manager 74 so that the reload manager 74 may update its records of what is the next ID to be unloaded from each 1st tier data buffers 61(a-c). Each time the block finite state machines 73(a-c) unload the $2^{nd}$ tier transfer buffer 65 they also notify the reload manager 74 as to the ID which was unloaded. This ensures that the transactions are processed sequentially and none are skipped.

At step 119, the operation of the hierarchical buffer system 60 determines if it is able to unload the 1st tier data buffers 61(a-c) early. If it is determined at step 119 that the 1st tier data buffers 61(a-c) can be unloaded early, then the operation of the hierarchical buffer system 60 then skips to step 127. The decision to unload early or not is done by the reload manager 74 and block finite state machines 73(a-c). When the block finite state machines 73(a-c) notifies the reload manager 74 that the $2^{nd}$ tier buffer is being or is about to be unloaded, the reload manager 74 determines if the next-to-unload 1st tier buffer can be signaled to unload its contents "early" or not. This decision is based on whether or not the 1st tier buffer has its data in it yet and whether it has already started, or is about to start unloading naturally. If it has available data but has not started to unload naturally, it will be signaled to unload early by the reload manager 74. However, if it is determined at step 119 that the 1st tier data buffers 61(a-c) cannot be unloaded early, then the operation of the hierarchical buffer system 60 determines if the delay count is less than the blocks per DRAM cycle count at step 121. If it is determined at step 121 that the delay count is not less than blocks per DRAM cycle count, then the operation of the hierarchical buffer system 60 decrements the delay count at step 121 and returns to repeat steps 109-121. However, if it is determined at step 121 that the delay count is less than the blocks per DRAM cycle count, then data in the 1st tier data buffers 61(a-c) is stored in the $2^{nd}$ tier transfer buffer 65 at step 127.

At step 129, it is determined if the delay count is equal to zero. If it is determined at step 127 that the delay count is not equal to zero, then the operation of the hierarchical buffer system 60 decrements the delay count at step 131 and returns to repeat steps 127-129. However, if it is determined at step 129 that the delay count is equal to zero, then hierarchical buffer system 60 skips to step 137.

At step 133, data requested by a processor 21 is stored for 1 cycle in the fast path staging register 62. At step 135, the data requested by a processor 21 stored in the in the fast path staging register 62 is stored in the $2^{nd}$ tier transfer buffer 65.

At step 137, data in the $2^{nd}$ tier transfer buffer 65 is stored in a block staging register 68. At step 139, data in the block staging register 68 is moved through the poison injector 69 onto the memory data channel 59. At step 141, the operation of the hierarchical buffer system 60 waits to receive the next requested data for processor 21. After receiving the requested data for processor 21, the operation of the hierarchical buffer system 60 then returns to repeat steps 103-141.

FIGS. 4A-D are timing diagrams depicting examples is of the operation of a hierarchical buffer system 100 according to one embodiment of the invention.

Illustrated in FIG. 4A, is an example timing diagrams for a flush read with zero read buffer delay. In situations where the memory data channel 59 is/will be free when the data is returned from the DRAM, there is no need to temporarily store the data in one of the 1st tier data buffers 61(a-c). In this case, the read data will circumvent the 1st tier data buffers 61(a-c) via a pipelining register, i.e. fast path staging register 62, as illustrated at 203 and be loaded by a flush read data buffer delay finite state machine 71 (a-d) directly into the $2^{nd}$ tier transfer buffer 65 as illustrated at 204. At the same time, one of the 3 block finite state machines 73(a-c), as illustrated as 205, will be invoked to immediately start the serialization of data from the $2^{nd}$ tier transfer buffer 65 onto the memory data channel 59. In this example, the $2^{nd}$ tier transfer buffer 65 acts as a simple staging register. This allows for flush read data to be moved though the structure with minimal latency, with the data never sitting in the buffer for more than a single cycle.

Illustrated in FIG. 4B, is an example timing diagram for a flush read, non-zero buffer delay. Since the buffer structure is intended for use in cascaded interconnect memory systems where a common data channel exists back to a memory controller from multiple buffer devices, it is possible to have a case where the read data can be loaded into the empty $2^{nd}$ tier transfer buffer 65, but cannot be immediately serialized out of the $2^{nd}$ tier transfer buffer 65 and put onto the memory data channel 59 (i.e. channel is in use). In this situation the data will again circumvent the 1st tier data buffers 61(a-c) and be loaded directly into the $2^{nd}$ tier transfer buffer 65. However in this case, the read data buffer delay finite state machines 71(a-c) will also provide a non-zero buffer delay wait time to the block finite state machines 73(a-c). The block finite state machines 73(a-c) will wait this buffer delay time before unloading the read data from the $2^{nd}$ tier transfer buffer 65 onto the memory data channel 59. If subsequent read operations are requested while this data is waiting in the $2^{nd}$ tier transfer buffer 65, the data from those operations will begin to fill the 1st tier read data buffers.

Illustrated in FIG. 4C, is an example timing diagram for a buffered read, early unload from a 1st tier buffer. In order to maximize the data throughput and ensure data is returned with the proper fixed timing though said hierarchical buffer system 60, care is taken to only utilize the 1st tier data buffers 61(a-c) when necessary, and unload data from them to the $2^{nd}$ tier transfer buffer 65 as soon as possible, thus freeing them up for subsequent read operations. When the block finite state machines 73(a-c) begin to unload its read data from the $2^{nd}$ tier transfer buffer 65 onto the memory data channel 59, it signals the reload manager 74 that the $2^{nd}$ tier transfer buffer 65 is available and provides the id for the data transfer just unloaded. If there is data awaiting unload in the 1st tier data buffers 61(a-c), the reload manager 74 will then signal the next in line read data buffer delay finite state machine 71(a-c) to unload its data from the 1st tier data buffer 61(a-c) into the $2^{nd}$ tier transfer buffer 65. This causes the read data buffer delay finite state machine 71(a-c) to load its read data into $2^{nd}$ tier transfer buffer 65 early, that is, before the wait count has reached the steps-per-DRAM cycle threshold. Then, the read data buffer delay finite state machine 71(a-c) invokes the next available block finite state machines 73(a-c) and the id and remaining wait count is transferred to the block finite state machines 73(a-c), counted off, and the data is unloaded onto the memory channel. In order to maximize the 1st tier data buffers 61(a-c) availability, the $2^{nd}$ tier transfer buffer 65 is often being loaded with new data while simultaneously unloading the previous read data onto the memory data channel 59.

Illustrated in FIG. 4D is an example timing diagrams where the $2^{nd}$ tier transfer buffer 65 can be loaded from two sources simultaneously and the shared data bus 59 will be available for immediate use. In this scenario, read data is being sourced from 2 locations, port A and port B. The transaction from port A is a burst chop 4 transaction with the transaction on port B being a BL8. Although occurring simultaneously, the read from port A is given priority on the shared data bus and will be transmitted back first. This will cause transaction A to utilize the fast path staging register and load into the top half of the $2^{nd}$ tier transfer buffer 65 and will be able to be transmitted to the block staging register immediately (i.e. read delay=0) Transaction B will need to be stored into one of the $1^{st}$ tier data buffer before being loaded into the $2^{nd}$ tier transfer buffer 65 and assigned a read delay of 4 blocks. Since the $2^{nd}$ tier transfer buffer 65 will only be half full when loaded with the data from transaction A and will be unloaded immediately into the block staging register, the lower half of the $2^{nd}$ tier transfer buffer 65 can start being loaded with the data from transaction B immediately. The data from transaction B is loaded sequentially starting with the lower slots of the $2^{nd}$ tier transfer buffer 65 and eventually overwriting the data from transaction A in the upper slots of the buffer which has since been unloaded.

Illustrated in FIG. 4E is an example timing diagrams including a flush read, buffered read, and normal unload from $1^{st}$ tier data buffer 61(a-c). As described above, if a subsequent read operation is requested when the $2^{nd}$ tier transfer buffer 65 is or will be in use, the data returned from that operation will be assigned a non-zero data buffer delay time and be stored in one of the $1^{st}$ tier data buffer 61(a-c). When the data is loaded into the $1^{st}$ tier data buffer 61(a-c), its corresponding read data buffer delay finite state machine 71(a-c) is invoked. The read data buffer delay finite state machine 71(a-c) will count down in DRAM clock cycles the read buffer delay wait time. Since the read buffer delay operates on a sub-DRAM clock cycle granularity, the read data buffer delay finite state machines 71(a-c) automatically invoke the next available block finite state machines 73(a-c) and unload its data into the $2^{nd}$ tier transfer buffer 65 once the read buffer delay count has reached the delay steps-per-DRAM cycle threshold. The remaining read buffer wait time (i.e. residue) is passed to the block finite state machines 73(a-c) when it is invoked, and the block finite state machines 73(a-c) will wait the remaining residue time before unloading the data from the $2^{nd}$ tier transfer buffer 65 onto the memory data channel 59. In this example the residue time is 0 and the read data is not delayed additional time in the $2^{nd}$ tier transfer buffer 65. In the preferred embodiment, the $2^{nd}$ tier transfer buffer 65 has two load ports.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims

What is claimed is:

1. A method of controlling data entries in a hierarchical buffer system for a plurality of memory sources, the method comprising:
managing buffers to allow multiple data packets to flow from a plurality of 1st tier buffers into a 2nd tier transfer buffer, wherein the 1st tier buffers and the 2nd tier transfer buffer operate on a first clock;
calculating precise synchronous delivery times for the multiple data packets in the 2nd tier transfer buffer; and
delivering at least one of the multiple data packets in the 2nd tier transfer buffer onto a shared data bus at the calculated precise synchronous delivery times using a second clock, wherein the first clock and the second clock are synchronous with each other.

2. The method of claim 1, further comprising:
using initial frame latency computations for the calculation of the precise synchronous delivery times.

3. The method of claim 1, further comprising:
employing a read data buffer delay for retaining multiple data packets in the 1st tier buffers until such time the at least one of the multiple data packets can be moved from the 1st tier buffers to the 2nd tier transfer buffer and from the 2nd tier transfer buffer onto the shared data bus.

4. The method of claim 3, further comprising:
moving the at least one of the multiple data packets to the 2nd tier transfer buffer passively upon expiration of the read data buffer delay.

5. The method of claim 3, further comprising:
moving the at least one of the multiple data packets to the 2nd tier transfer buffer actively once a slot is available in the 2nd tier transfer buffer.

6. The method of claim 1, wherein the 2nd tier transfer buffer can operate as a traditional First-In-First-Out buffer, and further comprises the ability for the 2nd tier transfer buffer to act as a staging register, and wherein the 2nd tier transfer buffer provides simultaneous loading of the multiple data packets for purposes of delivering the multiple data packets comprising a plurality of data transfer lengths with minimum latency.

7. The method of claim 1, further comprising:
a plurality of gear ratios for the purpose of synchronizing memory components with the shared data bus.

8. The method of claim 7, further comprising:
inserting idle gaps in a returning data stream to provide necessary speed matching between the plurality of gear ratios while maintaining a preferred data transfer rate.

9. The method of claim 7, further comprising:
returning buffered data from multiple transactions in a seamless pattern with no idle gaps inserted.

10. The method of claim 1, further comprising:
fast pathing data to minimize latency when the shared data bus is available and no buffering is required.

11. The method of claim 1, further comprising:
injecting a poison data pattern on a data frame boundary for purposes of alerting a memory controller to enact system recovery policies.

12. An integrated circuit device comprising:
a memory core;
a shared data bus;
a plurality of 1st tier buffers operating on a first clock that receive multiple data packets from the memory; and
a 2nd tier transfer buffer that receives data from the 1st tier transfer buffer operating on the first clock and delivers at the calculated precise synchronous delivery times at least one of the multiple data packets onto the shared data bus operating on a second clock, wherein the first clock and the second clock are synchronous with each other.

13. The integrated circuit device of claim 12, further comprising:
a plurality of read data buffer delay buffers for retaining the multiple data packets in the 1st tier buffers until such time the multiple data packets can be moved from the 1st tier buffers to the 2nd tier transfer buffer and from the 2nd tier transfer buffer onto the shared data bus, wherein the plurality of read data buffer delay buffers use initial frame latency computations for the purpose of calculating precise synchronous delivery times for the multiple data packets in the 1st tier buffers without the need for a tag, token, or alert mechanism.

14. The integrated circuit device of claim 13, wherein the multiple data packets in the a plurality of 1st tier buffers is moved to the 2nd tier transfer buffer passively upon expiration of the read data buffer delay and once a slot is available in the 2nd tier transfer buffer.

15. The integrated circuit device of claim 12, wherein the 2nd tier transfer buffer can operate as a traditional First-In-First-Out buffer, and further comprises the ability for the 2nd tier transfer buffer to act as a staging register, and wherein the 2nd tier transfer buffer provides simultaneous loading of the multiple data packets for purposes of delivering the multiple data packets comprising a plurality of data transfer lengths with minimum latency.

16. The integrated circuit device of claim 12, further comprising:
a plurality of gear ratios for the purpose of synchronizing memory components with the shared data bus, wherein at least one of the plurality of gear ratios inserts idle gaps in a returning data stream to provide necessary speed matching while maintaining a preferred data transfer rate.

17. A processor device comprising:
a cache core containing multiple data packets;
a shared data bus;
circuitry configured to:
managing buffers to allow the multiple data packets to flow from a plurality of 1st tier buffers into a 2nd tier transfer buffer, wherein the 1st tier buffers and the 2nd tier transfer buffer operate on a first clock; and
delivering the data onto a shared data bus operating on a second clock at calculated precise synchronous delivery times, wherein the first clock and the second clock are synchronous with each other.

18. The processor device of claim 17, further comprising:
a plurality of read data buffer delay buffers for retaining multiple data packets in the 1st tier buffers until such time the multiple data packets can be moved from the 1st tier buffers to the 2nd tier transfer buffer and from the 2nd tier transfer buffer onto the shared data bus, wherein the plurality of read data buffer delay buffers use initial frame latency computations for the purpose of calculating precise synchronous delivery times for the multiple data packets in the 1st tier buffers without the need for a tag, token, or alert mechanism.

19. The processor device of claim 17, wherein the 2nd tier transfer buffer can operate as a traditional First-In-First-Out buffer, and further comprises the ability for the 2nd tier transfer buffer to act as a staging register, and wherein the 2nd tier transfer buffer provides simultaneous loading of the multiple data packets for purposes of delivering the data comprising a plurality of data transfer lengths with minimum latency.

20. The processor device of claim 17, further comprising:
a plurality of gear ratios for the purpose of synchronizing memory components with the shared data bus, wherein at least one of the plurality of gear ratios inserts idle gaps in a returning data stream to provide necessary speed matching while maintaining a preferred data transfer rate.

* * * * *